Nov. 17, 1953    R. N. COLLINS    2,659,801
TEMPERATURE CONTROL DEVICE
Filed Oct. 6, 1950

Inventor:
Raymond N. Collins,
by Paul A. Frank
His Attorney.

Patented Nov. 17, 1953

2,659,801

UNITED STATES PATENT OFFICE 2,659,801

TEMPERATURE CONTROL DEVICE

Raymond N. Collins, Schenectady, N. Y., assignor to General Electric Company, a corporation of New York Application October 6, 1950, Serial No. 188,725

2 Claims. (Cl. 219—20)

1

My invention relates to temperature control devices and more particularly to such devices utilizing non-linear dielectric capacitors as the temperature sensitive elements.

An object of my invention is to provide a new and improved temperature control device.

Another object of my invention is to provide a new and improved temperature control circuit applicable to such a device.

A further object of my invention is to provide a new and improved temperature control circuit utilizing a non-linear dielectric capacitor which is more economical than similar control circuits known in the art.

A still further object of my invention is to provide a new and improved temperature control device which is applicable to either an on-off type controller or to a continuous type controller.

A still further object of my invention is to provide a new and improved electric circuit having an output signal which is dependent upon the temperature of a circuit element therein.

In the attainment of the foregoing objects I employ a thyratron discharge device in conjunction with an alternating voltage source to control the average current in and, consequently, the average temperature of an electric heating element. A phase changing circuit including a temperature sensitive capacitor is interconnected between a source of alternating voltage and the control electrode of the thyratron. The temperature sensitive capacitor is physically located such that the temperature thereof is dependent upon the temperature of the heating element to provide a feedback path between the anode circuit and the grid circuit of the thyratron. In consequence thereof, the firing time of the thyratron and hence the temperature of the heating element may be regulated. A simple and economical temperature control or regulator system is thus provided.

Figure 1:
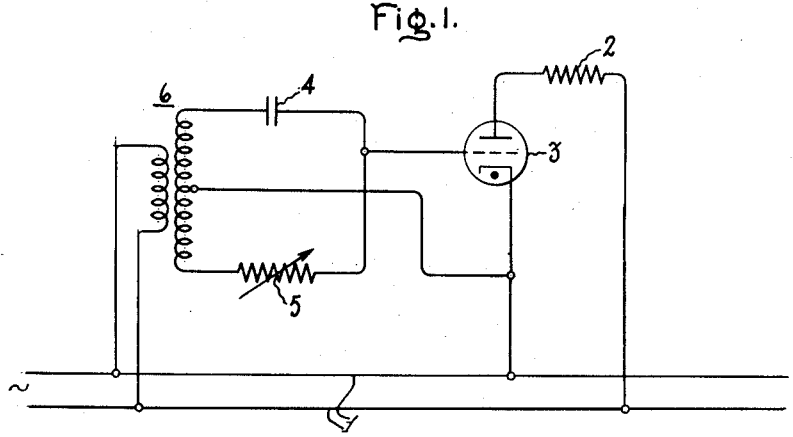

For further objects and advantages and for a better understanding of my invention attention is now directed to the following description and accompanying drawing and also to the appended claims. In the drawing, Fig. 1 is a schematic electric diagram illustrating an embodiment of a temperature controller constructed in accordance with my invention, and Fig. 2 is a capacitance versus temperature characteristic curve of a temperature sensitive capacitor which is applicable to the device of Fig. 1.

Referring to the drawing, a source of alternating electric voltage 1 and a heating element 2 are serially connected between the anode and the

2 cathode of a thyratron discharge device 3. A phase changing circuit including a temperature sensitive capacitor 4, i. e. a capacitor in which the dielectric constant varies with temperature, a variable resistor 5, and a transformer 6, is connected to supply the control electrode of device 3 with an alternating voltage signal. The primary winding of transformer 6 may be and preferably is connected to source 1. Capacitor 4 and resistor 5 are serially connected across the secondary winding of transformer 6 to form a phase changing circuit. The junction of capacitor 4 and resistor 5 is directly connected with the control electrode of device 3 and the cathode of device 3 is connected to a tap on the secondary winding of transformer 6.

Figure 2:
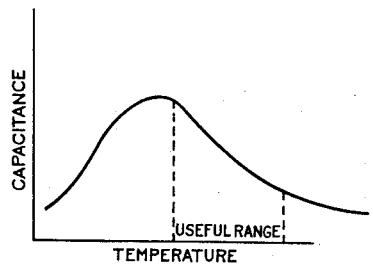

The chart in Fig. 2 indicates the relation between the capacitance of capacitor 4 and the temperature thereof. This particular curve is typical of a capacitor utilizing a ceramic of barium titanate, strontium titanate, barium and lead zirconate, etc. as the dielectric material. These ceramic dielectric materials have Curie points corresponding to the peak of the curve in Fig. 2 and have a high dielectric constant which varies inversely with temperature over a predetermined range of temperatures lying above the Curie point and designated generally in Fig. 2 as the "useful range." It will be understood that this curve of Fig. 2 is a typical one only and has been shown merely for illustrative purpose to facilitate a better understanding of this invention.

In normal operation, heating element 2 and capacitor 4 are positioned in a medium having a temperature to be regulated. The plate or anode and the grid or control electrode of thyratron 3 are supplied with an alternating voltage from the same source. The time of conduction of thyratron 3 is thus dependent upon the phase difference between the grid and plate voltages. The combination of capacitor 4, resistor 5 and the secondary winding of inductor 6 provides across capacitor 4 and a portion of the secondary winding a voltage which lags the supply voltage. As shown in Fig. 2, increasing the temperature of capacitor 4 increases the reactance thereof. Consequently, an increase in temperature of capacitor 4 increases the phase angle between the grid and plate voltages. This decreases the time of conduction of thyratron 3, thereby decreasing the amount of heat generated by heating element 2. Decreasing of the temperature of capacitor 4 conversely increases the current in element 2. Feedback is thus provided between the plate and grid of thyratron 3 by the effect on capacitor 4 of the heat generated by element 2.

Obviously, changes in the temperature response effect of capacitor 4 may be obtained by different settings of the variable resistor 5. In this way, various desirable temperature control levels of the heating element 2 may be selected by simply changing the setting of the resistor.

While this invention has been described by a particular embodiment thereof it will be understood that those skilled in the art may make many changes and modifications without departing from this invention. Therefore, by the appended claims I intend to cover all such changes and modifications which fall within the true spirit and scope of this invention.

What I claim as new and desire to secure by Letters Patent of the United States is:

1. A temperature control system comprising a thyratron discharge device having a cathode, an anode, and a control electrode; an electric heating element and a source of alternating voltage connected between said cathode and anode, a phase changing circuit and said alternating voltage source connected between said cathode and control electrode, said phase changing circuit including a capacitor having a ceramic dielectric whose dielectric constant varies inversely with changes in temperature thereof over a predetermined temperature range above the Curie point of said dielectric, said capacitor being positioned in heat receiving relation with said heating element so as to be heated to a temperature within said temperature range.

2. A temperature control system comprising a thyratron discharge device having a cathode, an anode, and a control electrode; an electric heating element and a source of alternating voltage connected between said cathode and anode, a transformer having a primary winding and a tapped secondary winding, said primary winding being connected across said alternating voltage source, said cathode being connected to the tap of said secondary winding, a capacitor and a variable resistor each connected from said control electrode to respective ends of said secondary winding, said capacitor having a dielectric comprising barium titanate ceramic whose dielectric constant varies inversely with temperature over a predetermined range of temperature above the Curie point of said dielectric, said capacitor being located in heat receiving relation to said heating element such that the temperature of said capacitor is dependent upon the heat generated by said heating element and falls within said temperature range.

RAYMOND N. COLLINS.

References Cited in the file of this patent

UNITED STATES PATENTS

| Number | Name | Date |
|---|---|---|
| 1,694,264 | Hull | Dec. 4, 1928 |
| 1,900,596 | Whitney | Mar. 7, 1933 |
| 2,138,731 | Craig | Nov. 29, 1938 |
| 2,349,849 | Deal | May 30, 1944 |
| 2,474,679 | Klug | June 28, 1949 |
| 2,505,565 | Michel et al. | Apr. 25, 1950 |
| 2,568,435 | Downey | Sept. 18, 1951 |

OTHER REFERENCES

Hull: General Electric Co. Research Laboratory Bulletin; No. 491, June 1930, pages 17 and 18.